(12) United States Patent
Geuzebroek et al.

(10) Patent No.: US 8,560,741 B2
(45) Date of Patent: Oct. 15, 2013

(54) DATA PROCESSING SYSTEM COMPRISING A MONITOR

(75) Inventors: Marc Jeroen Geuzebroek, Budel (NL); Andre Krijn Nieuwland, Waalre (NL); Hubertus Gerardus Hendrikus Vermeulen, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 58 days.

(21) Appl. No.: 13/120,087

(22) PCT Filed: Sep. 22, 2009

(86) PCT No.: PCT/IB2009/054139
§ 371 (c)(1),
(2), (4) Date: Mar. 21, 2011

(87) PCT Pub. No.: WO2010/032226
PCT Pub. Date: Mar. 25, 2010

(65) Prior Publication Data
US 2011/0179316 A1    Jul. 21, 2011

(30) Foreign Application Priority Data
Sep. 22, 2008 (EP) .................................... 08105403

(51) Int. Cl.
*G06F 3/00* (2006.01)
(52) U.S. Cl.
USPC ............ 710/15; 710/4; 710/7; 710/8; 710/18; 710/19; 710/20; 710/29; 710/31; 710/33
(58) Field of Classification Search
USPC ............ 710/4, 7, 8, 15, 18, 19, 20, 29, 31, 33
See application file for complete search history.

(56) References Cited

U.S. PATENT DOCUMENTS

| 8,325,618 | B2 * | 12/2012 | Goossens et al. | 370/252 |
|---|---|---|---|---|
| 2004/0184470 | A1 * | 9/2004 | Holden | 370/412 |
| 2005/0240780 | A1 | 10/2005 | MacIsaac | |
| 2006/0020924 | A1 | 1/2006 | Lo et al. | |
| 2006/0293831 | A1 * | 12/2006 | Yano | 701/114 |
| 2007/0121674 | A1 | 5/2007 | Chen et al. | |
| 2011/0029669 | A1 * | 2/2011 | Chuang et al. | 709/224 |

FOREIGN PATENT DOCUMENTS

| EP | 1 330 095 A1 | 7/2003 |
|---|---|---|
| EP | 1 667 025 A1 | 6/2006 |
| EP | 1811415 A1 | 7/2007 |
| WO | WO 2008/004187 A2 | 1/2008 |

OTHER PUBLICATIONS

ISA/EP, PCT International Search Report and Written Opinion dated Jul. 29, 2010 in application No. PCT/IB2009/054139.

* cited by examiner

*Primary Examiner* — Idriss N Alrobaye
*Assistant Examiner* — Jasjit Vidwan
(74) *Attorney, Agent, or Firm* — Fenwick & West LLP

(57) ABSTRACT

A data processing system 100 comprising a monitor 120 is provided and corresponding system-on-chip, method for monitoring and computer program product. The data processing system comprises multiple processing devices 104, 106, 116, 116 and a monitor 120. The monitor is configured to monitor characteristics of the data streams 102, 112, occurring among the plurality of data processing devices. The monitor comprises a means to determine whether a system characteristic substantially deviates from an expected system characteristic and to raise an anomaly signal if so. The system characteristic depends on the first characteristic and the second characteristic. In this way the monitor increases robustness by monitoring for problems related to deviations in the relation between multiple data streams.

18 Claims, 8 Drawing Sheets

802  S = C1 / C2
804  IF (S > E) THEN ANOMALY()

812  IF ( C1 > (C2 * E) ) THEN ANOMALY()

DATA PROCESSING SYSTEM COMPRISING A MONITOR

FIELD OF THE INVENTION

The invention relates to a data processing system comprising: multiple processing devices; and a monitor configured to monitor a first characteristic of a first data stream from a specific first one of the multiple processing devices to a specific second one of the multiple processing devices.

The invention also relates to a corresponding monitor, method for monitoring and computer program product.

BACKGROUND OF THE INVENTION

To meet the demanding requirements for consumer appliances, the industry is moving towards the integration of a complete system on a single chip, a so-called system-on-chip (SoC). A system-on-chip comprises multiple data processing devices. The multiple processing devices may include multiple heterogeneous processor cores and dedicated hardware peripherals. A system-on-chip typically runs several layers of software, such as: a drivers layer, an operating system layer, a streaming layer and a control layer. These layers of software are stacked upon each other and they cooperate to build a complete embedded application. System-on-chip designs can be used, e.g., for domestic and mobile appliances.

Between the processing devices many data streams are present. For example, after a first processor core has finished processing a data packet, e.g., a part of a picture, the data that results may be forwarded to a second processor core, for further processing of a different kind. The data is sent as a data stream over, e.g., a bus or a network-on-chip interconnect, etc., between the first processor core and the second processor core.

The data traffic in a data stream can be observed, i.e., measured by a monitor. The monitor may be capable of signaling that an abnormal condition is present in the data stream.

The published European patent application EP 1811415 discloses a known system comprised in a system-on-chip. The known system comprises an autonomous supervision module. The supervision module counts the data arriving in the secure system-on-chip and compares this number to a predefined maximum. An abnormal situation leads to a warning state in which the CPU can decide how to react.

SUMMARY OF THE INVENTION

In the known system a single data stream is monitored, i.e., the amount of data arriving in the known system. It is found to be a problem that no decision or observation can be made based on data traffic from two independent data streams. As a result, situations which are abnormal because of the relation between a first data stream and a second data stream are not detected, as a result of which the robustness suffers.

It is an object of the invention to improve robustness of a system-on-chip.

The data processing system according to the invention is characterized in that the monitor is further configured to monitor a second characteristic of a second data stream from a specific third one of the multiple processing devices to a specific fourth one of the multiple processing devices; the monitor further comprises a means to determine whether a system characteristic substantially deviates from an expected system characteristic and to raise an anomaly signal if so, said system characteristic depends on the first characteristic and the second characteristic.

As long as the amount of traffic in a single data streams stays within the expected limits of that data stream, a monitor which operates only on a single characteristic cannot detect any abnormal situation in that stream.

However, if the monitor considers the first characteristic in relation to a second characteristic, it may detect that, e.g., the proportion between them is outside of expected limits. That is, a mismatch is detected between the first data stream and the second data stream.

By considering a second characteristic in addition to considering a first characteristic, more abnormal conditions can be detected. Such an abnormal condition may indicate typical robustness problems, such as, a security problem, a hardware/software bug, or a reliability problem. When such an abnormal condition is detected an anomaly signal is raised. The anomaly signal can be acted upon by other elements of the data processing system as appropriate. As a result the robustness of the system is increased.

The system characteristic may be explicitly determined, for example, by a means for determining a system characteristic in dependency on the first characteristic and a second characteristic.

In a preferred embodiment of the data processing system the monitor further monitors a third characteristic of a third data stream from a specific fifth one of the multiple processing devices to a specific sixth one of the multiple processing devices. The first characteristic is represented by a first value. The second characteristic is represented by a second value. The third characteristic is represented by a third value. The system characteristic is determined in dependency on the sum of the first characteristic and the second characteristic and on the third characteristic.

Using a third characteristic and the sum of the first value and the second value, robustness is particularly increased as some common situation can then be monitored. For example, it is a common situation that one processing device forwards input data it has received from two other processing devices. Possibly, before forwarding the input data, the input data are processed further. In this situation an abnormal situation is detected when the output of the one processing device differs substantially from the combined amounts of input data.

In a preferred embodiment of the data processing system the monitor is configured to throttle at least one of the first data stream and the second data stream in case the anomaly signal is raised.

One situation that may lead to a crash of the data processing system occurs when a part of the system is overflowed with data. Using a monitor according to the invention an impending overflow can be detected. It is useful, in that situation to throttle one or more of the data streams, to avoid the overflow. This prevents the crash and thereby increases the robustness of the system.

The invention can also be applied in a monitor for use in a data processing system according to the invention.

The invention provides a data processing system comprising a monitor and a corresponding system-on-chip, a method for monitoring and a computer program product. The data processing system comprises multiple processing devices and the monitor. The monitor is configured to monitor characteristics of the data streams occurring among the plurality of data processing devices. The monitor comprises a means to determine whether a system characteristic substantially deviates from an expected system characteristic and to raise an anomaly signal if so. The system characteristic depends on the first characteristic and the second characteristic. In this way the monitor increases robustness by monitoring for problems related to deviations in the relation between multiple data streams.

For completeness reference is made to published patent application WO/2008/004187 with title: "ELECTRONIC DEVICE, SYSTEM ON CHIP AND METHOD OF MONITORING DATA TRAFFIC", which discloses an electronic device. The electronic device comprises a plurality of processing units. Between the plurality of processing units there is a first communication path. The electronic device further comprises a first monitoring unit for monitoring the data traffic of the first communication path and for outputting the results of the first monitoring unit to a first monitoring service access unit using a second communication path. The electronic device further comprises a second monitoring unit for monitoring the data traffic of the second communication path and for outputting the results of the second monitoring unit to a second monitoring service access unit using a third communication path. However no determination is made whether any aggregate system characteristic deviates from an expected system characteristic. Furthermore, no anomaly signals are raised either.

BRIEF DESCRIPTION OF THE DRAWINGS

The invention is explained in further detail by way of example and with reference to the accompanying drawings, wherein:

FIG. 8 illustrates a first example and a second example that can be used as part of the data monitor.

Throughout the Figures, similar or corresponding features are indicated by same reference numerals.

Figure 1:
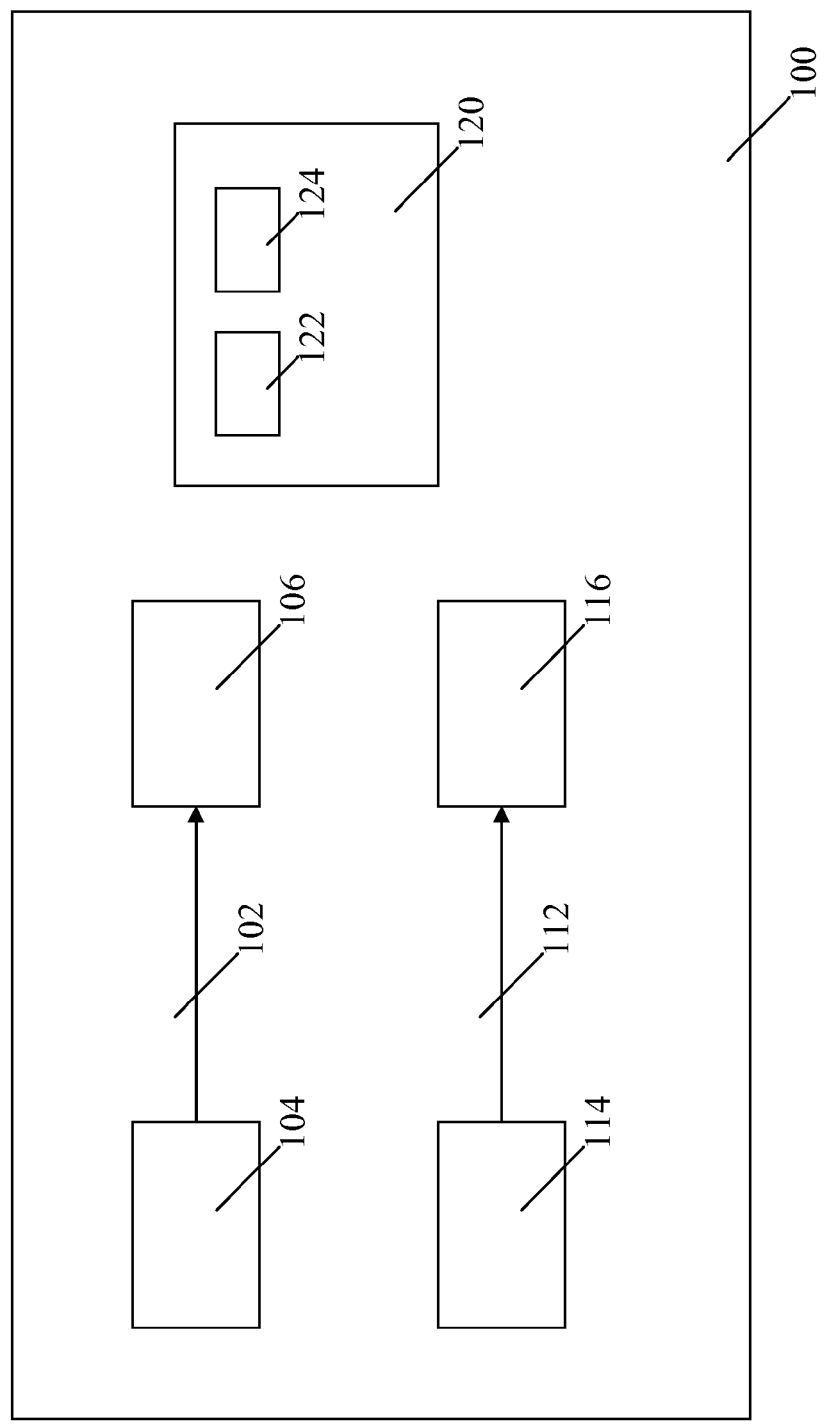
FIG. 1 is a block diagram illustrating a first embodiment of the data processing system according to the invention.

LIST OF REFERENCE NUMERALS 100 a data processing system
102 a first data stream
104 a first processing device
106 a second processing device
112 a second data stream
114 a third processing device
116 a fourth processing device
120 a monitor
122 a means to determine a system characteristic
124 a means to determine whether the system characteristic substantially deviates from an expected system characteristic and to raise an anomaly signal if so.
402 a third data stream
404 a fifth processing device
406 a sixth processing device
500 a graphics processing system
502 a memory
504 a scaler
506 a data stream
508 a data stream
514 a graphics DSP
516 a data stream
518 a data stream
600 a data bus
602 a bus connection
604 a bus connection
614 a bus connection
620 a bus connection
630 a CPU
632 a memory
702 monitoring a first characteristic of a first data stream from a specific first one of the multiple processing devices to a specific second one of the multiple processing devices
704 monitoring a second characteristic of a second data stream from a specific third one of the multiple processing devices to a specific fourth one of the multiple processing devices
706 determine whether a system characteristic substantially deviates from an expected system characteristic and to raise an anomaly signal if so

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In FIG. 1 a first embodiment of a data processing system 100 according to the invention is illustrated. Data processing system 100 comprises multiple processing devices. In the figure four processing devices are shown: a first processing device 104, a second processing device 106, a third processing device 114 and a fourth processing device 116. A processing device is embodied, for example as: a CPU, a DSP, an I/O device, a bus, a memory, etc.

First processing device 104 is configured for connecting using a first connection to second processing device 106, along which connection data may be transmitted in a first data stream 102 from first processing device 104 to second processing device 106.

Third processing device 114 is configured for connecting using a second connection to fourth processing device 116, along which connection data may be transmitted in a second data stream 112 from third processing device 114 to fourth processing device 116.

Data processing system 100 further comprises a monitor 120. Monitor 120 comprises a means 122 to determine a system characteristic and a means 124 to determine whether the system characteristic substantially deviates from an expected system characteristic and to raise an anomaly signal if so. Typically means 122 and means 124 will be embodied by a CPU running a computer program executing software. Means 122 and/or means 124 could also be executed in hardware, e.g., as a gate array.

Note that, means 122 and means 124 may be combined into a single means. Moreover, the system characteristic need not be computed explicitly; see FIG. 8.

Monitor 120 is configured for connecting to data stream 102 and data stream 112 for monitoring. At least part of the data transmitted along the first connection and along the second connection is accessible to monitor 120, in some form. The data may be accessibly by monitor 120 partially or in full, or summarized, or as an entity representative of the data. The data may be summarized, for example, in the form of totals, e.g. total amount of data, total amount of packets, etc. Monitor 120 comprises a means 122 to determine a system characteristic and a means 124 to determine whether the system characteristic substantially deviates from an expected system characteristic and to raise an anomaly signal if so. Note that monitor 120 may monitor other data streams than the first data stream 102 and the second data stream 112. Also the system characteristic may depend on one or more characteristics monitored in one or more such other data streams. The system characteristic may also depend on other variables such as a system state that the system may be in. For example, the monitor 120 may compute the system characteristic in a different manner during the system state of boot-up when the behavior of the system is well known and well predictable. Also the expected system characteristic may depend on the system state, e.g., be more stringent when there are no outside influences on the processing by data processing system 100. For example, when the system is not connected to a data network, such as the Internet, a more strict expected system characteristic may be possible than when the data processing system 100 is connected to an external network.

During operation, the processing devices 104, 106, 114 and 116 cooperate to perform a data processing system task. Processing device 104 causes a data to be transmitted to processing device 106, in this way a data stream 102 is started. Similarly, processing device 114 causes data to be transmitted to processing device 116 and in this way data stream 112 is started. Since the processing devices cooperate on a single data processing system task there will typically be some relation between the data stream 102 and data stream 112.

Monitor 120 monitors a first characteristic of the first data stream 102. For example, monitor 120 monitors the amount, e.g. volume, of data in data stream 102. Monitor 120 may, for example, receive a verbatim copy of data stream 102, and monitor as a characteristic all the bytes comprised in the verbatim copy, e.g., during a time interval, i.e. time period, e.g. a pre-determined time unit, by counting the number of bytes received. Monitor 120 may also perform some intermediate processing in the course of the monitoring, for example, monitor 120 may remove headers before counting bytes.

Also, monitor 120 monitors a second characteristic of the second data stream 112, typically, the monitoring of the second data stream 112 will be similar to the monitoring of the first data stream 102. But this is not necessary. For example, in the course of monitoring the second data stream 112, headers may be stripped or ignored, whereas, in data stream 102 there may be no headers to begin with.

After a first characteristic and a second characteristic have been determined, a system characteristic is determined by means 122. Next, means 124 compares the computed system characteristic with an expected system characteristic. If means 124 determines that the system characteristic and the expected system characteristic do not match or deviate from each other, and if means 124 also determines that this deviation is outside some predefined deviation acceptance limit, the means 124 will raise an anomaly signal.

Data monitor 120 may only monitor for deviations in one direction. For example, data monitor 120 may only raise the anomaly signal when the system characteristic is too high. On the other hand data monitor 120 may also monitor for any deviation from the expected system characteristic. For example, data monitor 120 may raise the anomaly signal when the system characteristic is too high or too low.

An anomaly signal can comprise additional information, such as the type of anomaly that occurred, a time stamp, an identifier of the data streams that were involved, etc. Typically, the anomaly signal is forwarded to an anomaly handler, which can take corrective action. Corrective action can include: repeating the data processing operation that caused the anomaly signal, shutting down the data handling system, and clearing all memories, etc. Typically the anomaly handler will be comprised in data processing system 100.

As the anomaly signal may be associated with a security issue, such as a possible intrusion, additionally actions may be initiated that are typically associated with such an eventuality. Those may include: logging the anomaly signal or the intrusion in a log file; sending the anomaly signal, e.g., using e-mail, to an authority figure, such as a system operator or a security guard; logging out the user causing the anomaly signal, etc.

The monitor 120 may, optionally, be connected to at least one of the first data stream 102 and the second data stream 112, in order to reduce the throughput of that data stream by throttling it. The data monitor 120 may, for example, block all throughput of the throttled data stream. The data monitor 120 may, for example, only allow a fixed amount of data per unit of time through the throttled data stream. The data monitor 120 may, for example, enforce an expected characteristic on the throttled data stream.

For example, the data processing system 100 may be accommodated in a communication device which encrypts data before transmitting it. Processing device 104 produces data, processing device 106 encrypts data, processing device 114 encodes data using a turbo encoder and processing device 116 exports the data to an output device, such as an antenna. Between processing device 106 and processing device 114 there may be some further, intermediate, processing entities (not shown). A connection from processing device 106 to processing device 114 may be present (not shown). In this situation, all the data of data stream 102 will at some point be present in data stream 112 in some representation.

In the example, monitor 120 may monitor the first characteristic as the amount of data coming through data stream 102 in a first time interval and the second characteristic as the amount of data coming through data stream 112 in a second interval. In a first example, the encryption and encoding do not expand the amount of data. That is, the amount of data coming through data stream 102 in a first time interval is equal to the amount of data coming through data stream 112 in a second time interval. For this first example, means 122 may be executed as a subtraction device. The system characteristic is computed by subtracting the second characteristic from the first characteristic. The expected system characteristic in this situation is then zero. Based on the deviation between data stream 102 and data stream 112 that is possible, and the amount of traffic that is expected to go through these streams, a deviation limit can be established of say a numerical value 'C'. Once the means 124 detects the system characteristic to be larger than the expected system characteristic plus 'C' or smaller than the expected system characteristic minus 'C', means 124 can raise the anomaly signal.

In a second example, the encoding and/or the encryption do expand the amount of data. In this example, means 122 can be executed as a division circuit. The system characteristic is then computed as the quotient of the first characteristic and the second characteristic. Suppose that the encryption and the encoding together expand the amount of data by a factor of 'k', then the expected system characteristic would be '1/k'. Means 124 can raise the anomaly signal when it detects a substantial deviation from the expected system characteristic.

Note that the quotient circuit can also be used for means 124 in case there is no expansion, i.e. 'k' equals 1, in this situation the expected system characteristic is 1.

Note that it may be advantageous to choose the first time interval at a different moment in time as the second time interval. For example, data in a monitored data stream 102 and monitored data stream 112 exist may only be correlated, when the two data streams are compared at different moments in time. This may happen, for example, in case the second processing device 106 and/or third processing device 114 hold up the data by processing it for some time. Even if data stream 102 and data stream 112 are correlated at the same moment in time, the correlation may be stronger when the streams are compared some time apart. As a result monitor 120 may monitor the first characteristic and second characteristic separated in time. For example, when amounts of data in a first time period and a second time period are compared, the first time period may not, or at most partially overlap the second time period.

In a third example, the first data stream 102 is a copy of the second data stream 112. A first data word transmitted at a first moment in data stream 102 is monitored by monitor 120 as a first characteristic, and a second data word transmitted at a second moment in data stream 112 is a second characteristic. Means 124 is a comparison circuit which gives the Boolean value 1 if the first characteristic is equal to the second characteristic and which gives the Boolean value 0, if the first characteristic is not equal to the second characteristic. The expected system characteristic is 1, that is, it is expected that the first data word is equal to the second data word. In case the comparison circuit gives the Boolean value 0, the anomaly signal is raised.

It is an advantage that monitor 120 can take two characteristic values into account. In a typical system the amount of data processed may vary, e.g. based on user input, or input from a data network, etc. Yet there may still be relations between the various data streams. By monitoring these relations, deviations from expected situations are detected. Such deviations indicate some abnormality. A robust system wants to avoid situations that deviate from normal, since such deviations may indicate bugs, malfunctions, security breaches, operation outside of specification, etc.

The first characteristic and/or the second characteristic need not to be computed in batch, but may also be updated continuously. For example, a characteristic may indicate the amount of data passed through data stream 102 in the past second, or some other interval. Similarly, the system characteristic may be updated continuously.

In FIG. 8, a first example and a second example are given which can be used for part of data monitor 120, embodied in software running on a processor. Note that the software is given in FIG. 8 as pseudo-code. The first example can be used for means 122 and means 124 and comprises the lines indicated with reference numerals 802 and 804. The second example comprises the line indicated with reference numeral 812. The second example combines means 122 and 124.

In the first example a system characteristic is computed explicitly. In the second example a comparison is made with a system characteristic, yet the system characteristic is not computed explicitly.

In the first example, on line 802 a system characteristic 'S' is computed explicitly by dividing a first characteristic: a numerical value 'C1', by a second characteristic: a numerical value 'C2'. On line 804, the system characteristic 'S' is compared with an expected system characteristic 'E'. In case the system characteristic 'S' is larger than the expected system characteristic 'E' the anomaly signal is raised. In this example, the anomaly signal is raised by calling an anomaly function 'ANOMALY( )'.

In the second example, given on line 812, the function of means 122 and means 124 are integrated into one function. Provided the second characteristic 'C2' is not zero, line 812 has substantially the same function as lines 802 and 804. Note that the system characteristic is not explicitly computed. In line 812, the first characteristic C1 is compared with the product of the second characteristic 'C2' and the expected characteristic. In case the first is larger than the former the anomaly signal is raised. Note that, although a comparison is made with the system characteristic, the system characteristic is not computed explicitly.

Figure 2:
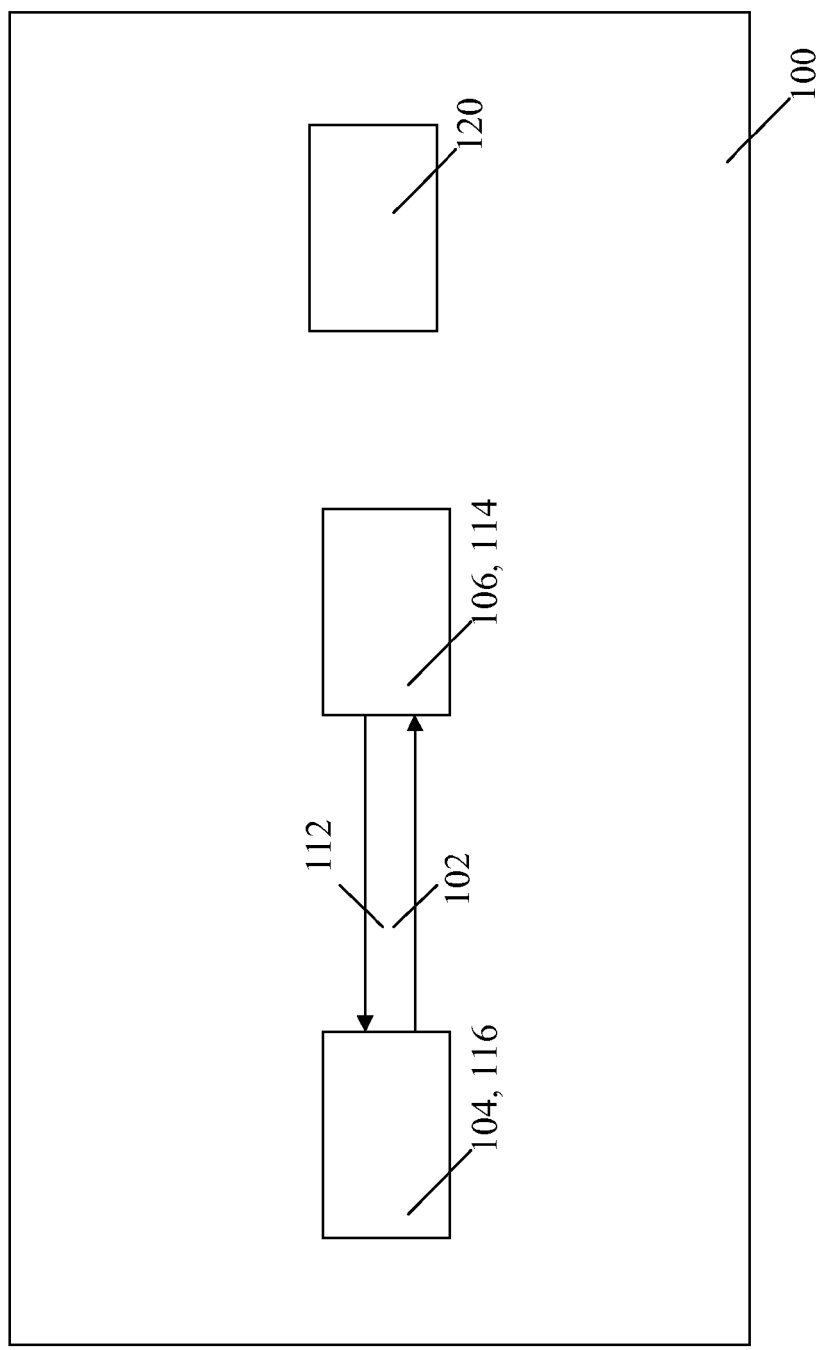
FIG. 2 is a block diagram illustrating a second embodiment of the data processing system according to the invention.

In FIG. 2 a second embodiment of the data processing system 100 according to the invention is illustrated.

As in FIG. 1, the data processing system 100 comprises a first processing device 104 and a second processing device 106.

First processing device 104 is configured for connecting using a first connection to second processing device 106, along which connection data may be transmitted in a first data stream 102 from first processing device 104 to second processing device 106.

First processing device 104 also functions as the fourth processing device 116. The second processing device 106 also functions as the third processing device 114.

Second processing device 106 is configured for connecting using a second connection to first processing device 104, along which connection data may be transmitted in a second data stream 112 from second processing device 106 to first processing device 104.

Data monitor 120, also comprised in data processing system 100, acts on data stream 102 and 112 as is explained for FIG. 1. In order to avoid obscuring the figure means 122 and means 124 have been omitted from the figure.

Figure 3:
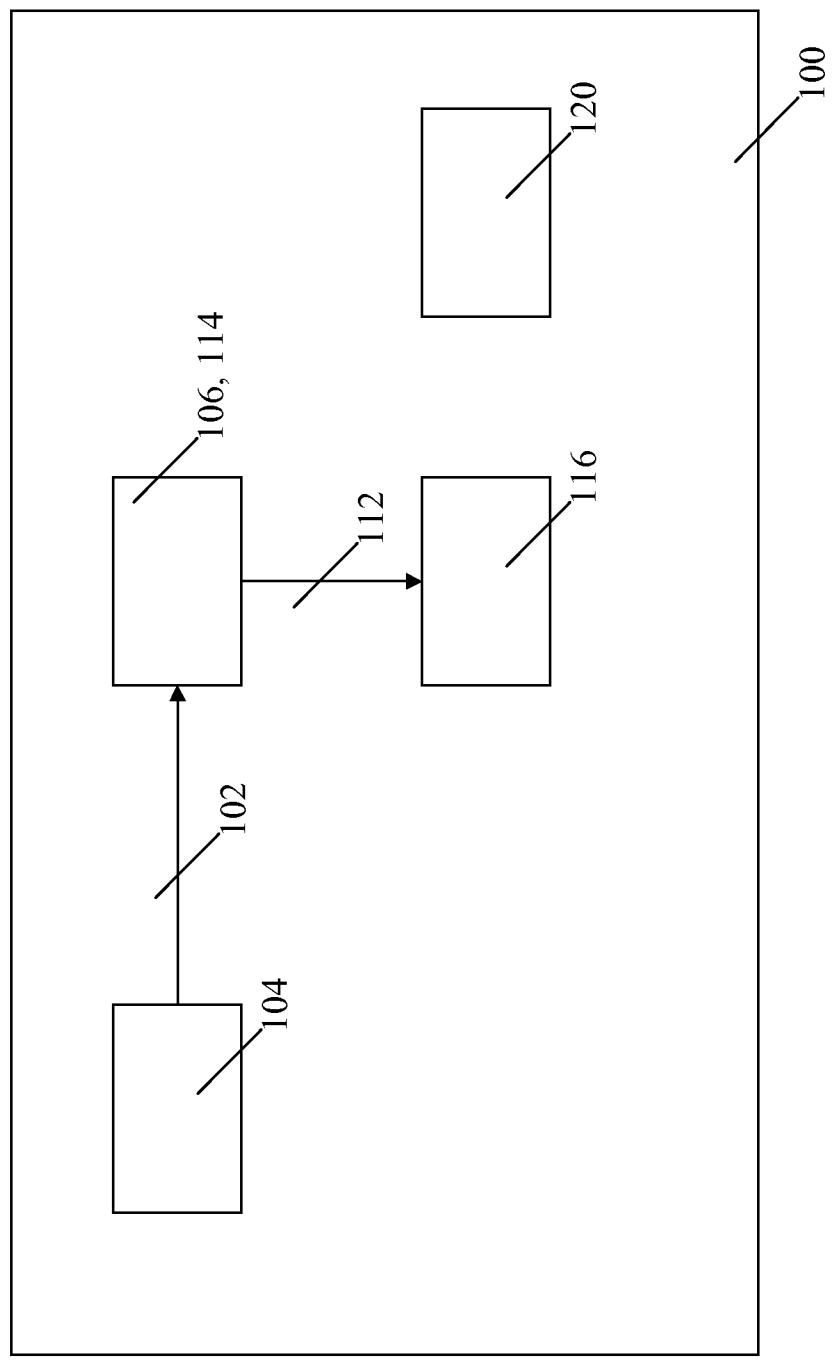
FIG. 3 is a block diagram illustrating a third embodiment of the data processing system according to the invention.

In FIG. 3 a third embodiment of the data processing system 100 according to the invention is illustrated.

As in FIG. 1, the data processing system 100 comprises a first processing device 104, a second processing device 106 and a fourth processing device 116.

First processing device 104 is configured for connecting using a first connection to second processing device 106, along which connection data may be transmitted in a first data stream 102 from first processing device 104 to second processing device 106.

Second processing device 106 also functions as the third processing device 114.

Second processing device 106 is configured for connecting using a second connection to a fourth processing device 116, along which connection data may be transmitted in a second data stream 112 from second processing device 106 to fourth processing device 116.

Data monitor 120, also comprised in data processing system 100, acts on data streams 102 and 112 as is explained for FIG. 1. In order to avoid obscuring the figure means 122 and means 124 have been omitted from the figure.

This embodiment is especially advantageous when a data stream needs sequential processing by three data processors.

Figure 4:
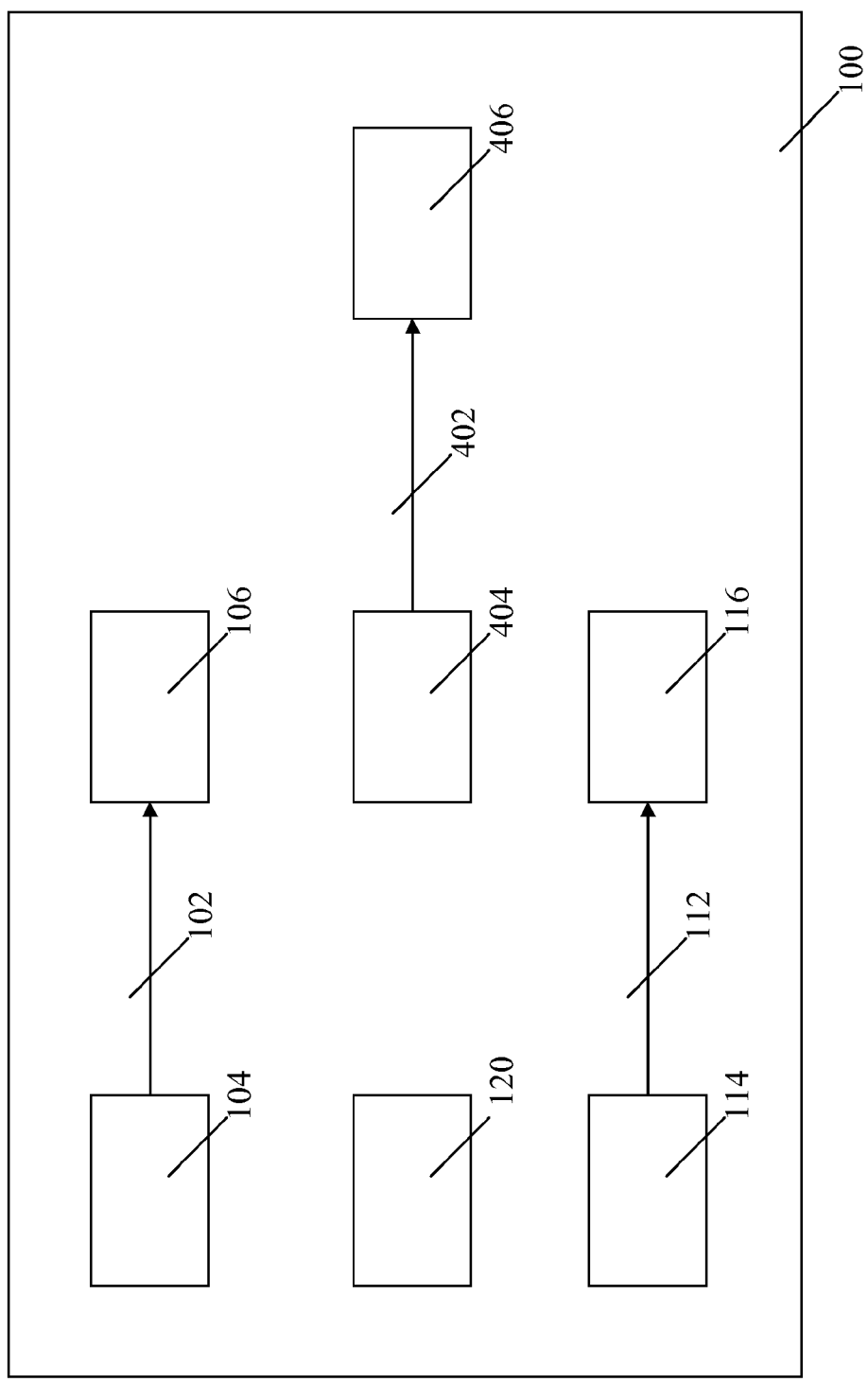
FIG. 4 is a block diagram illustrating a fourth embodiment of the data processing system according to the invention.

In FIG. 4 a fourth embodiment of a data processing system 100 according to the invention is illustrated. Data processing system 100 comprises multiple processing devices. In FIG. 4, six processing devices are shown: a first processing device 104, a second processing device 106, a third processing device 114, a fourth processing device 116, a fifth processing device 404 and a sixth processing device 406. A processing device may be embodied, for example as: a CPU, a DSP, an I/O device, a bus, a memory, etc.

First processing device 104 is configured for connecting using a first connection to second processing device 106, along which connection data may be transmitted in a first data stream 102 from first processing device 104 to second processing device 106.

Third processing device 114 is configured for connecting using a second connection to fourth processing device 116, along which connection data may be transmitted in a second data stream 112 from third processing device 114 to fourth processing device 116.

Fifth processing device 404 is configured for connecting using a third connection to sixth processing device 406, along which connection data may be transmitted in a third data stream 402 from fifth processing device 404 to sixth processing device 406.

Data processing system 100 further comprises a monitor 120. Monitor 120 comprises
a means 122 (not shown in FIG. 4) to determine a system characteristic and a means 124 (not shown in FIG. 4) to determine whether the system characteristic substantially deviates from an expected system characteristic and to raise an anomaly signal if so. Typically means 122 and means 124 will be embodied by a CPU running a computer program executing software.

Monitor 120 monitors data stream 102, data stream 112 and data stream 402. The system characteristic depends on, a combination of, e.g., the sum of the first characteristic and the second characteristic and on the third characteristic. As a first example, the first characteristic is representative of a first amount of data in data stream 102, the second characteristic is representative of a second amount of data in data stream 112, and the third characteristic is representative of a third amount of data in data stream 402. Moreover, both the first amount of data and the second amount of data is to pass through data stream 402. Also, the third characteristic is measured at the moment the latter occurs. Under these circumstances a system characteristic may be the sum of a numerical representation of the first characteristic and a numerical representation of the second characteristic minus a numerical representation of the third characteristic. Under the right circumstances the expected value of this system characteristic is zero. In a second example, the first, second and third characteristic are defined as in the first example. The system characteristic is defined as the sum of a numerical representation of the first characteristic and a numerical representation of the second characteristic divided by a numerical representation of the third characteristic. Under the right circumstances the expected value of this system characteristic is one.

Note that the sum of the first characteristic and the second characteristic cannot always be taken to be the arithmetical sum. For example, in case the first characteristic is an average amount of data coming through data stream 102 in a first time interval, and the second characteristic is an average amount of data coming through data stream 112 in a second time interval, it may be more appropriate to compute the sum of the first characteristic and the second characteristic as a weighted sum. For example, as the length of the first time interval multiplied by the first characteristic plus the length of the second time interval multiplied by the second characteristic.

Monitor 120 comprises a means (not shown) to determine whether the system characteristic substantially deviates from an expected system characteristic and to raise an anomaly signal if so. For example, monitor 120 may compute the system characteristic according to any of the examples given above and compare the computed system characteristic with the expected value. Substantial deviation can be determined by considering normal deviations from expected behavior of the data processing system 100, under the circumstances.

Figure 5:
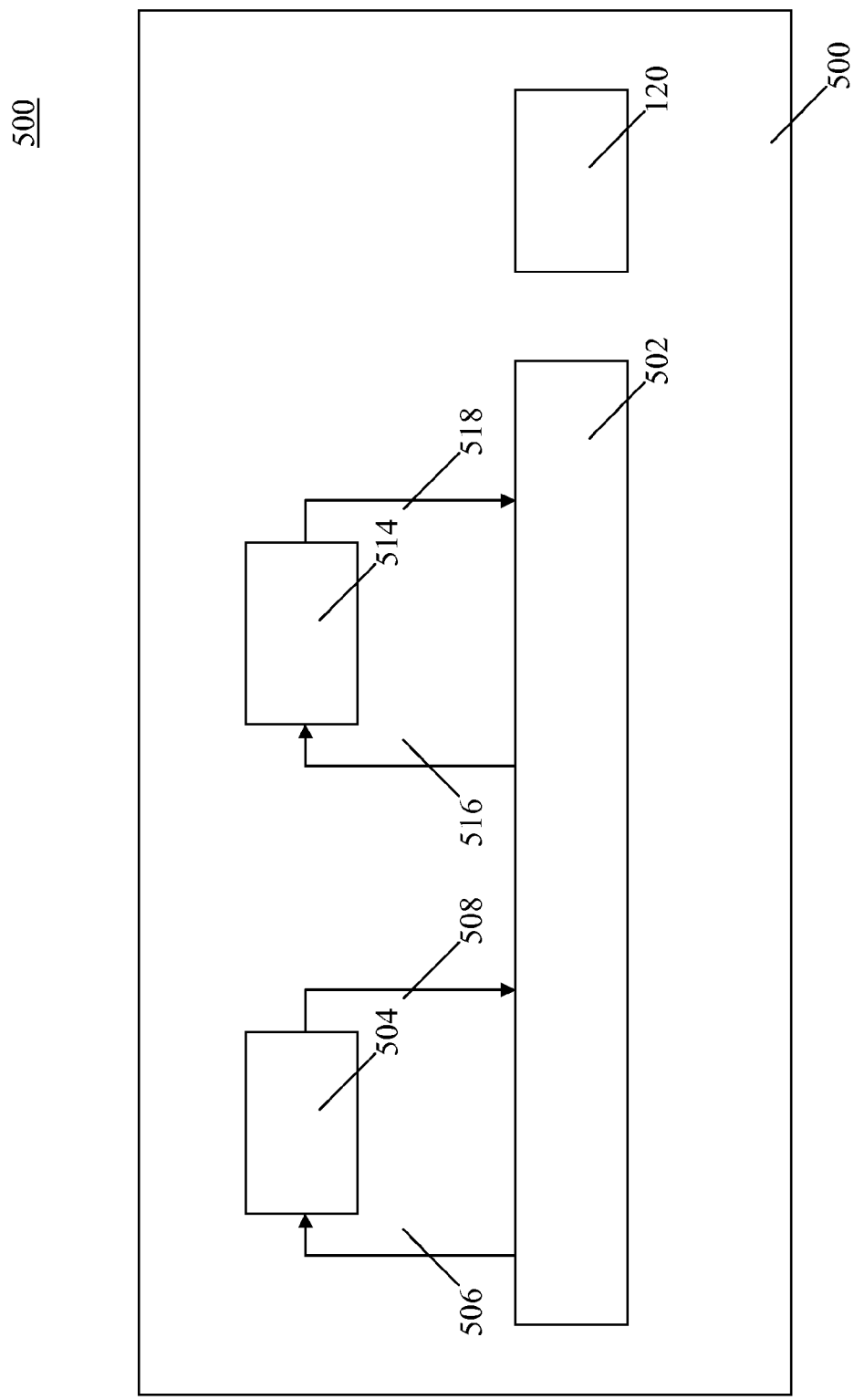
FIG. 5 is a block diagram illustrating a graphics processing system

In FIG. 5 a block diagram illustrating a graphics processing system 500 is shown.

Graphics processing system 500 is a System-on-Chip design operable to resize an image to half its original height and to half its original width and to invert the colors in the image. Graphics processing system 500 comprises several processing devices, e.g. cores, and hardware peripherals, among which traffic streams are present. Between some of the different data streams in graphics processing system 500 specific relations exist.

Graphics processing system 500 comprises scaler 504, a graphics digital signal processor (DSP) 514 and a memory 502. Scaler 504 is connected to memory 502 through a first connection (not shown). Graphics DSP 514 is connected to memory 502 through a second connection (not shown). Scaler 504 can use the first connection for at least two data streams: data stream 506 and data stream 508. Graphics DSP 514 can use the second connection for at least two data streams: data stream 516 and data stream 518. The first connection and/or second connection may, for example, be embodied as a bus, a direct connection, a network-on-chip connection, etc.

Scaler 504 is operable to resize an image to half its original height and width. Scaler 504 may, for example, operate by removing every other image line, and remove every other pixel in the lines kept. Graphics DSP 514 is operable to invert the colors in an image. Graphics DSP 514 may, for example, operate, by performing an exclusive-or operation (XOR) on the image data with a mask consisting of binary 1's.

Graphics processing system 500 further comprises a data monitor 120.

During operation, an image, comprising image data, is stored in memory 502. The image data is retrieved from memory 502 and sent to scaler 504 through the first connection in data stream 506. Scaler 504 receives data stream 506 and resizes the image data comprised in data stream 506 to resized image data. Scaler 504 sends the resized image data through the first connection in data stream 508 to memory 502, where the resized image data is stored.

The resized image data is retrieved from memory 502 and sent to graphics DSP 514 through the second connection in data stream 516. Graphics DSP receives the resized image data and inverts the colors in the resized image data to inverted image data. Graphics DSP 514 sends the inverted image data through the second connection in data stream 518 to memory 502, where it is stored.

Data monitor 120 is connected to the first connection and to the second connection, through which data monitor 120 can monitor the amount of image data that passes through data streams 504, 508, 516 and 518.

The resized image that scaler 504 produces is 4× smaller than the original image. As a result, there is 4:1 relation between the amount of traffic in data stream 506 and data stream 508. Data monitor 120 monitors these amounts and divides the amount of image data that passes through data stream 504 by the amount of image data that passes through data stream 508 to obtain a first system characteristic. Data monitor 120 may use a divider for this operation (not shown). The first system characteristic is compared to the expected system value of 4.

Graphics DSP 514 reads the resized image data, i.e. the scaled down image from memory 502, in data stream 516. The resized image data was earlier written by scaler 504, as a result there is 1:1 relation between the amount of image traffic in data stream 508 and in data stream 516. Data monitor 120 monitors these amounts and divides the amount of image data that passes through data stream 508 by the amount of image data that passes through data stream 516 to obtain a second system characteristic. Data monitor 120 compares the second system characteristic with the expected system characteristic of 1.

Inverting the colors does not change the size and amount of memory space required for the storage of the processed image. Therefore also between data stream 516 and data stream 518 a 1:1 relation exists in image data traffic. Data monitor 120 can compute a third system characteristic to verify also that this property of the graphics processing system is present. Note that also data stream 506 and data stream 518 have a relation, namely of 4:1, which relation can be verified by data monitor 120.

When there is a mismatch between the actual relation between data streams, as expressed in a system characteristic, and an expected relation, as expressed in an expected system characteristic, a security problem, a hardware/software bug, or a reliability problem, etc, may be present. If a processing device, such as a CPU, reads more data from memory than expected with respect to some other data stream with another hardware block, a security intrusion may be present. The CPU may be misused for reading data from the memory which was not intended to happen. A mismatch may also indicate a hardware flaw or a software bug in the SoC. When one data stream consumes more bandwidth than expected, this bandwidth is taken away from other data streams. As a result other hardware blocks may not be able to read or write their data in time, resulting in reliability problems in the system.

Known traffic monitors and/or regulators that are present in SoCs rely only on measurements of the amount of data of a single stream and as a result are not able to detect a mismatch in the relations between different data streams. A monitor that checks relative relations between two transactions, as expressed in two or more data streams that these transactions generate, enables a more fine grained detection of possible problems within a system. When the amount of traffic in a data stream stays within its individual limits, current data monitors will not detect any problem. Even if a mismatch in the relation in the amount of data between the streams exists, it will remain undetected by current traffic monitors. A data monitor according to the invention that checks said relation does detect the mismatch.

Advantageously, the invention may also be employed in prototype system chips to help identify and locate some types of problems. This results in more efficient and effective debugging of such prototype system chips and their embedded software. More effective debugging yields shorter times-to-market and shorter times-to-volume.

Figure 6:
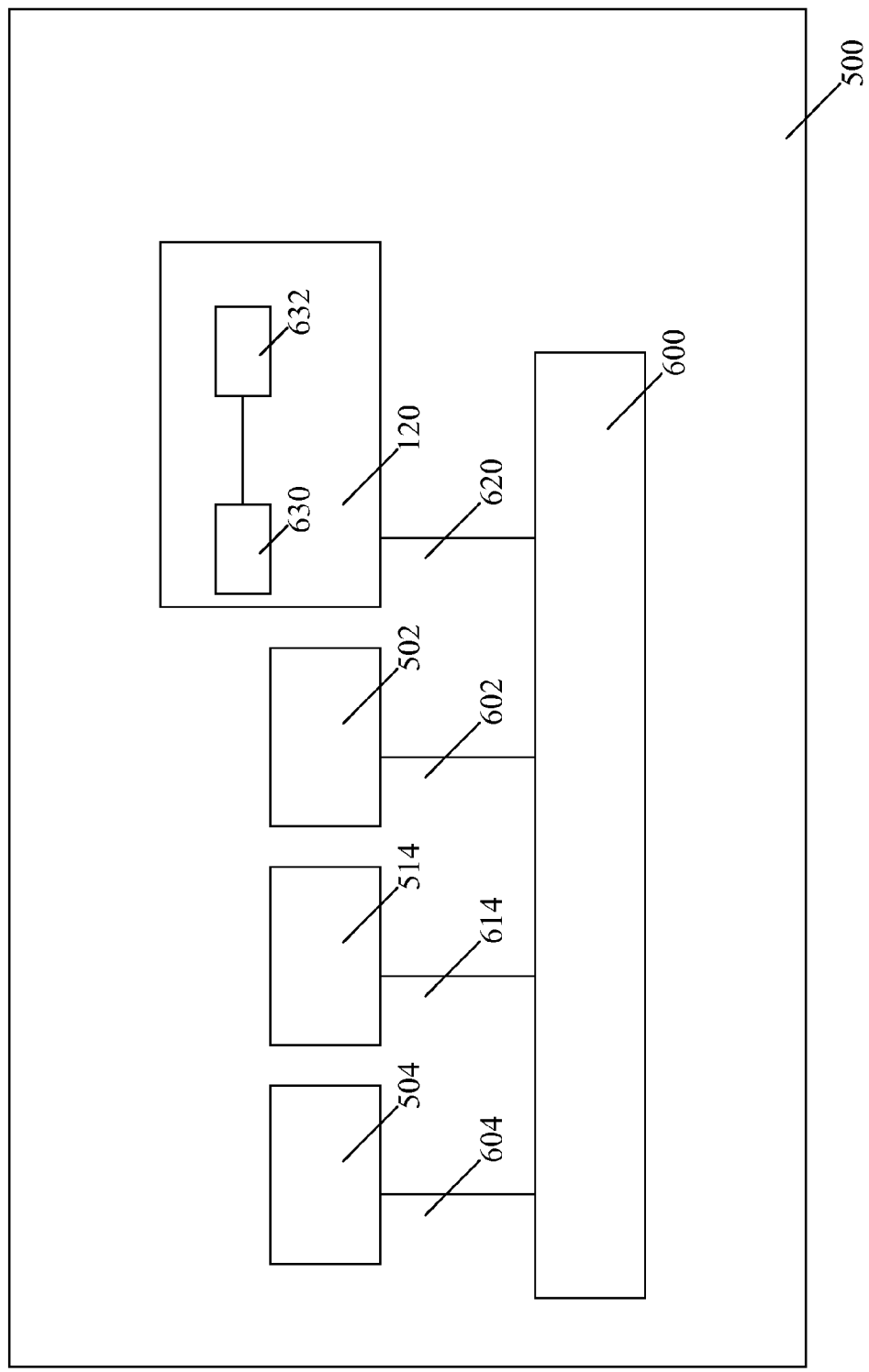
FIG. 6 is a block diagram illustrating an embodiment of a monitor according to the invention.

FIG. 6 is a block diagram illustrating an embodiment of graphic processing system 500. Graphic processing system 500 comprises a bus 600. Memory 502 is connected to bus 600 via bus connection 602. Scaler 504 is connected to bus 600 via bus connection 604. Graphics DSP 514 is connected to bus 600 via bus connection 614.

The first connection from scaler 504 to memory 502 is made via bus connection 604, bus 600 and bus connection 602. The second connection from graphics DSP 514 to memory 502 is made via bus connection 614, bus 600 and bus connection 602.

Data monitor 120 is connected to bus 600 via bus connection 620. Data monitor 120 comprises a central processing unit (CPU) 630 and a memory 632.

During operation, CPU 630 runs a software program stored in memory 632. CPU 630 monitors via connection 620 the data traffic on bus 600. Note that both the first connection and the second connection comprise bus 600. Accordingly, the data streams 506, 508, 516 and 518 can be monitored by monitoring the data traffic on bus 600.

CPU 630 intercepts a copy of each data packet that goes over bus 630. CPU 630 has the ability to identify the data stream, if any, to which a given data packet belongs. CPU 630 may, for example, determine the data stream on the basis of the following factors:

Initiating processing device as indicated by a tag in the given data packet

Target processing device as indicated by a tag in the given data packet

Initiator transaction ID

Target transaction ID

One or more addresses comprised in the given data packet, as compared with certain predetermined address ranges, etc As an example of the latter, the data monitor may know that a certain address is exclusively targeted by a certain data processing device, and from this deduce that the corresponding data belongs to a certain data stream.

For example, CPU 630 may determine that a given data packet belongs to data stream 506 when the given packet comprises an initiator tag related to memory 502 and a target tag related to scaler 504.

A data monitor could identify a data object in a data stream based on side-band information which is associated with the data stream. For example, the side-band information may be multiplexed in the data-stream, or the side-band information may be transmitted using a separate channel. Side-band information includes, for example: address range, stream ID, transaction ID, initiator device ID, target device ID. The side-band information may also include an indication whether the data stream is secure or insecure or an indication of the privilege level of the data stream. In this context a transaction ID can be regarded as an example of a 'tag'.

As a further example: A first device and a second device are arranged to communicate over a bus. The first device initiates the communication and the second device is the target for the communication. To start the data stream over the bus the first device provides information to the second device, on the kind of transfer that will take place, for example by sending a type-indication. The information on the kind of transfer is side-band information. The second device uses this side-band information to further process the data. For example: in case of a write operation, the second device may use the side-band information to determine what to do with the write-data, e.g., where to store it; in case of a read operation the second device may use the side-band information to determine which data to return and in what format. The side-band information may also be used by a data monitor, such as data monitor 120.

Optionally, CPU 630 can send a signal via bus 600 to any one of data processing device 502, 504 and 514 to limit the amount of data they send, or to limit the amount of data they can accept from any given source. For example, a processing device, such as device 502, 504 and 514 may include a data filter, that filters incoming data received in a data stream, in dependency on, e.g., a tag comprised in the incoming data, which tag indicates the source processing device of the incoming data, the data filter being selectively activatable with an activation signal. Moreover, raising the anomaly signal can comprise, or consist of, sending the activation signal to the processing device, such as device 504. The data filter may be configured for filtering out, i.e. blocking, all data coming from a particular source processing device. The data filter may also be configured for filtering out part of the data coming from a particular source processing device.

CPU 630 may be further configured to be programmable by means of an on-chip debug infrastructure or memory-mapped I/O (MMIO). The programming may include: programming the time-window in which the amount of traffic in a data streams is monitored, i.e. measured; programming the relation in the amount of data between two or more data streams; enabling/disabling the monitoring; enabling/disabling the active throttling to enforce the traffic relation between two or more data streams.

Figure 7:
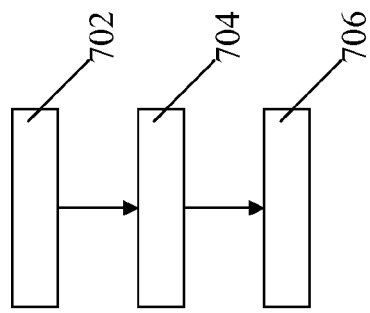
FIG. 7 is a flowchart illustrating a method according to the invention.

In FIG. 7 a flowchart is shown illustrating a method 700 according to the invention.

Method 700 comprises:

monitoring 702 a first characteristic of a first data stream from a specific first one of the multiple processing devices to a specific second one of the multiple processing devices;

monitoring 704 a second characteristic of a second data stream from a specific third one of the multiple processing devices to a specific fourth one of the multiple processing devices;

determining 706 whether a system characteristic substantially deviates from an expected system characteristic and to raise an anomaly signal if so. The system characteristic depends on the first characteristic and the second characteristic.

The determining 706 may be advantageously split into two steps. First determining a system characteristic, e.g., in accordance with a function, in dependency on the first characteristic and the second characteristic; and subsequently determining whether the system characteristic substantially deviates from an expected system characteristic and raising an anomaly signal if so.

Method 700 can be implemented as a computer program product, e.g., as software. For example, software comprising a number of processing means, such that each step of a method according to the invention can be achieved by at least one of the number of processing means. In one embodiment each specific processing means of the number of processing means corresponds to a specific step of the method according to the invention. The programming means can be fabricated using various well known high-level programming languages, such as, C, C++ or Pascal. The programming means can alternatively be fabricated using low-level programming languages such as assembly, machine codes or microcode. A processing means can correspond to an architectural structure, such as a subroutine, or an object, but this is not necessary, and a processing means can also correspond to one or more lines of programming code, or part thereof. A processing means could also be comprised in a larger processing means which may also address some other goal of the software.

The computer program product comprising computer code is typically recorded on a computer readable medium, such as a hard disk, a flash memory, etc.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention.

For example, the order of certain operations carried out can often be varied, additional operations can be added or operations can be deleted without departing from the invention. Error trapping, enhancements and variations can be added without departing from the present invention. Such variations are contemplated and considered equivalent.

The present invention could be implemented using special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention. In a claim enumerating several means, several of these means may be embodied by one and the same item of hardware.

Those skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The invention claimed is:

1. A data processing system comprising:
a plurality of processing devices on a single chip, comprising a first processing device, a second processing device communicating with the first processing device, a third processing device and a fourth processing device communicating with the third processing device;
one or more communication paths configured to enable communication between the first processing device and the second processing device, and between the third processing device and the fourth processing device; and
a monitor coupled the one or more communication paths, the monitor configured to:
monitor a first amount of data in data stream from the first processing device to the second processing device;
monitor a second amount of data in data stream from the third processing device to the fourth processing device;
determine whether a relationship between the first amount of data and the second amount of data satisfy an expected relationship;
generate an anomaly signal responsive to the relationship between the first amount of data and the second amount of data not satisfying the expected relationship; and
throttle the data stream from the first processing device to the second processing device or the data stream from the third processing device to the fourth processing device responsive to generating the anomaly signal.

2. The data processing system of claim 1 wherein the fourth processing device is the first processing device and the second processing device is the third processing device.

3. The data processing system of claim 1, wherein the second processing device is the fourth processing device.

4. The data processing system of claim 1, wherein the first amount of data is transferred during a first time period, and the second amount of data is transferred during a second time period different from the first time period.

5. The data processing system of claim 4, wherein the first time period partially overlaps the second time period.

6. The data processing system of claim 1, wherein:
the relationship between the first amount of data and the second amount of data represents a ratio between the first amount of data and the second amount of data.

7. The data processing system of claim 1, wherein the plurality of processors further comprises a fifth processing device and a sixth processing device, and wherein the monitor is further configured to:
monitor a third amount of data from the fifth processing device to the sixth processing device;
determine another relationship between the third amount of data and the first amount of data or the second amount of data; and
generate the anomaly signal responsive to the other relationship between the third amount of data and the first amount of data or the second amount of data not satisfying another expected relationship.

8. The data processing system of claim 1, wherein the data processing system is a system-on-chip.

9. The data processing system of claim 1, wherein a processor in the plurality of processors is a digital signal processing unit.

10. The data processing system of claim 1, wherein a processor in the plurality of processors is a central processing unit, an input/output unit, a bus or a memory.

11. A method for monitoring a data processing system comprising a plurality of processing devices, the method comprising:
communicating data stream from a first processing device in a chip to a second processing device in the chip;
communicating data stream from a third processing device in the chip to a fourth processing device in the chip;
monitoring in the chip a first amount of data in the data stream from the first processing device to the second processing device;
monitoring in the chip a second amount of data in the data stream from the third processing device to the fourth processing device;
determining whether a relationship between the first amount of data and the second amount of data satisfy an expected relationship;
generating an anomaly signal responsive to the relationship between the first amount of data and the second amount of data not satisfying the expected relationship; and
throttling the data stream from the first processing device to the second processing device or the data stream from the third processing device to the fourth processing device responsive to generating the anomaly signal.

12. The method of claim 11, wherein the fourth processing device is the first processing device and the second processing device is the third processing device.

13. The method of claim 11, wherein the second processing device is the fourth processing device.

14. The method of claim 11, wherein the first amount of data is transferred during a first time period, and the second amount of data is transferred during a second time period different from the first time period.

15. The method of claim 14, wherein the first time period partially overlaps the second time period.

16. The method of claim 11, wherein:
the relationship between the first amount of data and the second amount of data represents a ratio between the first amount of data and the second amount of data.

17. The method of claim 11, further comprising:
communicating data stream from the fifth processing device to the sixth processing device;
determine another relationship between the third amount of data and the first amount of data or the second amount of data; and
generate the anomaly signal responsive to the other relationship between the third amount of data and the first amount of data or the second amount of data not satisfying another expected relationship.

18. A non-transitory computer-readable storage medium storing instructions thereon, the instructions when executed by a processor cause the processor to:
communicate data stream from a first processing device in a chip to a second processing device in the chip;
communicate data stream from a third processing device in the chip to a fourth processing device in the chip;
monitor in the chip a first amount of data in the data stream from the first processing device to the second processing device;
monitor in the chip a third amount of data in the data stream from the third processing device to the fourth processing device;
determine whether a relationship between the first amount of data and the second amount of data satisfy an expected relationship;
generate an anomaly signal responsive to the relationship between the first amount of data and the second amount of data not satisfying the expected relationship; and
throttle the data stream from the first processing device to the second processing device or the data stream from the third processing device to the fourth processing device responsive to generating the anomaly signal.

* * * * *